United States Patent
Procter et al.

(10) Patent No.: US 9,045,096 B2
(45) Date of Patent: Jun. 2, 2015

(54) COUPLING ASSEMBLY

(75) Inventors: John Procter, Sherman, TX (US); Rik Westerink, Corinth, TX (US)

(73) Assignee: Zodiac Seats US LLC, Gainesville, TX (US)

(*) Notice: Subject to any disclaimer, the term of this patent is extended or adjusted under 35 U.S.C. 154(b) by 498 days.

(21) Appl. No.: 13/108,637

(22) Filed: May 16, 2011

(65) Prior Publication Data

US 2011/0278885 A1 Nov. 17, 2011

Related U.S. Application Data

(60) Provisional application No. 61/334,718, filed on May 14, 2010.

(51) Int. Cl.
*B60R 11/02* (2006.01)
*B64D 11/00* (2006.01)
*B60R 11/00* (2006.01)

(52) U.S. Cl.
CPC ......... *B60R 11/0235* (2013.01); *B60R 11/0252* (2013.01); *B60R 2011/0014* (2013.01); *B60R 2011/0015* (2013.01); *B60R 2011/0017* (2013.01); *B60R 2011/0075* (2013.01); *B60R 2011/008* (2013.01); *B64D 11/0015* (2013.01)

(58) Field of Classification Search
USPC ................ 297/188.04, 188.05, 188.06, 188.2
See application file for complete search history.

(56) References Cited

U.S. PATENT DOCUMENTS

| | | | | |
|---|---|---|---|---|
| 4,681,366 A | * | 7/1987 | Lobanoff | 297/188.06 |
| 5,000,511 A | * | 3/1991 | Shichijo et al. | 297/188.05 |
| 6,007,036 A | * | 12/1999 | Rosen | 248/286.1 |
| 6,216,927 B1 | * | 4/2001 | Meritt | 224/275 |
| 6,966,533 B1 | * | 11/2005 | Kalis et al. | 248/316.4 |
| 7,040,699 B2 | * | 5/2006 | Curran et al. | 297/217.3 |
| 7,261,266 B2 | * | 8/2007 | Satterfield | 248/284.1 |
| 2003/0226148 A1 | * | 12/2003 | Ferguson | 725/75 |

(Continued)

FOREIGN PATENT DOCUMENTS

| WO | 9904381 | 1/1999 |
|---|---|---|
| WO | 2008014352 | 1/2008 |
| WO | 2011143648 | 11/2011 |

OTHER PUBLICATIONS

International Preliminary Report on Patentability dated Nov. 29, 2012 in Application No. PCT/US2011/036619.

(Continued)

*Primary Examiner* — David R Dunn
*Assistant Examiner* — Timothy J Brindley
(74) *Attorney, Agent, or Firm* — Kilpatrick Townsend and Stockton LLP

(57) ABSTRACT

Described are portable electronics device coupling assemblies including a cradle configured to electronically couple and releasably engage a portable electronics device, and an adaptor configured to electronically couple and releasably engage the cradle to a passenger seat. Other examples may include a passenger seat having an electronics port configured to electronically couple to the portable electronics device, and a receptacle coupled to the electronics port and configured to releasably engage the portable electronics device. As examples, the portable electronics device may be a tablet computer, a cell phone, a smart phone, a handheld video game system, a personal digital assistant, a palmtop computer, a DVD player, data or audio-video media, or a multi-media enabled device.

8 Claims, 8 Drawing Sheets

(56) References Cited

U.S. PATENT DOCUMENTS

2006/0128573 A1* 6/2006 Botz et al. .................... 508/517
2006/0290654 A1* 12/2006 Wang ........................... 345/156
2007/0222248 A1 9/2007 Maulden et al.
2008/0051160 A1 2/2008 Seil et al.
2008/0138039 A1 6/2008 Wu et al.
2009/0292851 A1* 11/2009 Mead et al. ................... 710/303
2011/0075331 A1 3/2011 Grieg et al.

OTHER PUBLICATIONS

International Search Report and Written Opinion dated Dec. 16, 2011 in Application No. PCT/US2011/036619.

* cited by examiner

COUPLING ASSEMBLY

CROSS REFERENCE TO RELATED APPLICATION

This application is related to and claims priority benefits from U.S. Provisional Application Ser. No. 61/334,718, filed on May 14, 2010, entitled PROVISIONS FOR INTEGRATING TABLET COMPUTERS AND MULTIMEDIA-ENABLED SMART PHONES FOR USE AS IN-FLIGHT ENTERTAINMENT. The '718 application is hereby incorporated herein in its entirety by this reference.

FIELD OF THE INVENTION

The invention relates to portable electronics device coupling assemblies for use with passenger seats or the like.

BACKGROUND

In many instances, passenger vehicles, such as aircraft, buses, trains, ships, and automobiles, include passenger seats with a wide assortment of personal electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rests of the passenger seats.

With the advent of portable electronics devices ("PEDs"), such as tablet computers, cell phones, smart phones, handheld video game systems, personal digital assistants, palmtop computers, DVD players, data and audio-video media, multimedia enabled devices, and other similar electronic devices, many passengers prefer to use their own PEDs, rather than the OBE or IFE components that are mounted in the passenger seats.

In some cases, it may be desirable to provide a way for passengers to connect their PEDs to the OBE or IFE systems, so that they may use their own PEDs in lieu of the OBE or IFE systems. In other cases, it may be desirable to provide a way for passengers to connect their PEDs to the OBE or IFE systems to use in conjunction with the system's video display or to receive power for their PEDs or otherwise.

In other cases, it may be desirable for the airline to purchase commercially available PEDs for the use of passengers in conjunction with the OBE or IFE systems, where the passengers may either use the PEDs in lieu of the system components or in conjunction with those components to provide the passenger with additional entertainment options.

In yet other cases, it may be desirable for the passenger to be able to mount the PEDs to the passenger seats for hands-free viewing.

SUMMARY

Embodiments of the invention may comprise a portable electronics device coupling assembly comprising a cradle configured to electronically couple and releasably engage a portable electronics device, and an adaptor configured to electronically couple and releasably engage the cradle to a passenger seat. In some embodiments, the cradle may comprise at least one arm configured to electronically engage a receptacle on the portable electronics device. The cradle may be rotatably coupled to the adaptor. The portable electronics device may be, but is not necessarily limited to, a tablet computer, a cell phone, a smart phone, a handheld video game system, a personal digital assistant, a palmtop computer, a DVD player, data or audio-video media, or a multi-media enabled device.

Other embodiments may comprise a passenger seat comprising an electronics port configured to electronically couple to the portable electronics device, and a receptacle coupled to the electronics port and configured to releasably engage the portable electronics device. The receptacle may be mounted adjacent a video display or to the passenger seat back or to a deployment arm, which may in turn be pivotally coupled to, for example, the passenger seat arm, the passenger seat back, or a tray table.

In some embodiments, the portable electronics device coupling assembly is configured to electronically couple the portable electronics device to the electronics port and releasably engage the portable electronics device to the receptacle. In these embodiments, the adaptor of the portable electronics device coupling assembly may be rotatably coupled to the receptacle.

In some embodiments, the portable electronics device coupling assembly is assembled by electronically coupling the adaptor to the entertainment port, and releasably engaging the adaptor to the passenger seat. The portable electronics device coupling assembly may be further assembled by releasably engaging the cradle of the portable electronics device coupling assembly to the portable electronics device. The cradle may also be electronically coupled to the portable electronics device.

DETAILED DESCRIPTION

Figure 1:
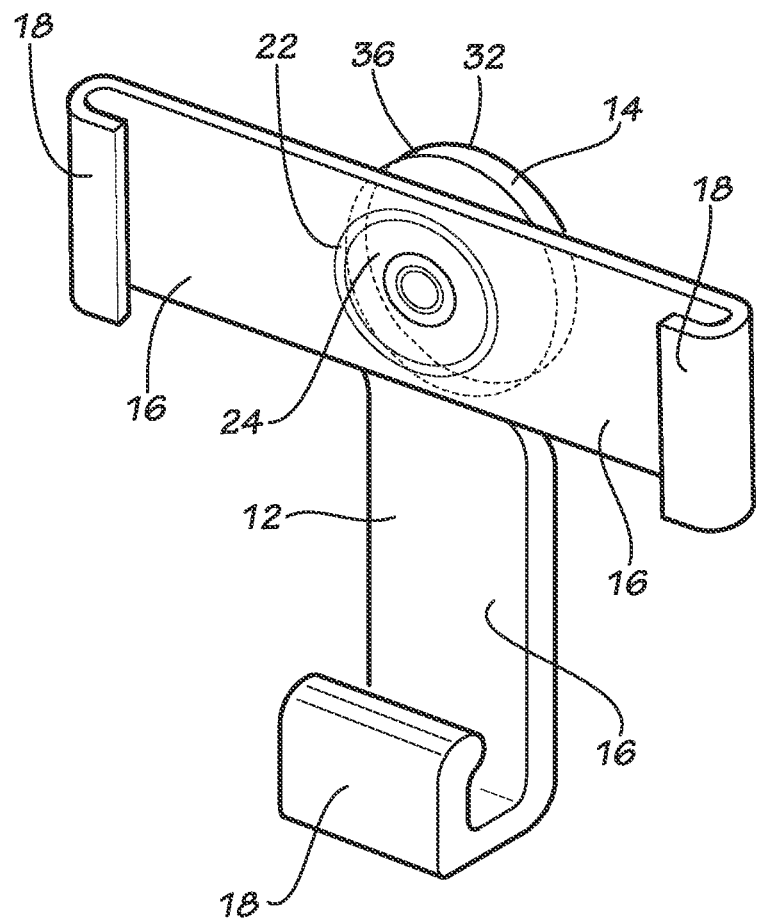
FIG. 1 is a perspective view of a cradle according to one embodiment of the present invention.

The described embodiments of the invention provide PED coupling assemblies for use with a passenger seat. While the PED coupling assemblies are discussed for use with aircraft passenger seats, they are by no means so limited. Rather, embodiments of the PED coupling assemblies may be used for other seats of any type or otherwise as desired.

FIGS. 1-9 illustrate embodiments of a PED coupling assembly 10. In these embodiments, the PED coupling assembly 10 comprises a cradle 12 and an adaptor 14. The cradle 12 and the adaptor 14 may be formed of materials including but not limited to plastics, aluminum, stainless steel, other metallic materials, composite materials, or other suitable materials.

In some embodiments, the cradle 12 comprises at least one arm 16. In the embodiments shown in FIGS. 1-9, the cradle 12 has a T-shape formed by three arms 16. The arms 16 may have adjustable lengths that allow a passenger to insert PEDs 20 having a variety of sizes and shapes within the cradle 12. One of ordinary skill in the relevant art will understand that the cradle 12 may have any suitable number of arms 16 and any suitable shape that allows the cradle 12 to releasably couple to the PED 20 including but not limited to rectilinear, cross, I-shape, X-shape, and other similar shapes.

In some embodiments, a retaining device 18 is positioned at an end of each arm 16 of the cradle 12. In these embodiments, the retaining device 18 is shaped to receive and hold in place a PED 20. Examples of suitable PEDs 20 include but are not limited to tablet computers, cell phones, smart phones, handheld video game systems, personal digital assistants, palmtop computers, DVD players, data and/or audio-video media, multi-media enabled devices, and other similar electronic devices.

The cradle 12 includes an aperture 22 that is configured to couple the cradle 12 to the adaptor 14. A first end 24 of the adaptor 14 is configured to be inserted within the aperture 22.

In some embodiments, a PED interface 26 is coupled to the adaptor 14. Examples of suitable PED interfaces 26 include but are not limited to any suitable cables that transfer data (uni-directional or bi-directional) and/or power. In some embodiments, the PED interface 26 may be one or more cords that extend from the adaptor 14 adjacent and external to one or more of the arms 16 of the cradle 12, so that the PED interface 26 may be easily manipulated into the proper location to connect to the PED 20 in a variety of locations. In yet other embodiments, the PED interface 26 may be a wireless connection between the PED 20 and a wireless router. One of ordinary skill in the relevant art will understand that any suitable style of PED interface 26 may be used to electronically mate with the PED 20.

In some embodiments, the PED interface 26 includes a connector 28 that is configured to be inserted into a suitable receptacle 30 on the PED 20. In the embodiment shown in FIGS. 5 and 9, the PED interface 26 is positioned within one of the arms 16 of the cradle 12, and the connector 28 is positioned within the retaining device 18 so that the connector 28 is aligned and inserted within the receptacle 30 when the PED 20 is inserted into the cradle 12. In this embodiment, the connector 28 is a thirty-pin connector (a thirty-pin connector is typical on iPhones®, iPads®, etc.). However, one of ordinary skill in the relevant art will understand that any suitable type and style of connector 28 may be used that is configured to interface with a suitable receptacle 30 on the PED 20 and may be positioned in any suitable location within or adjacent the cradle 12. One or more connectors 28 may also be positioned at the end of the PED interface 26 in the embodiments where the PED interface 26 may be one or more cords that extend from the adaptor 14 adjacent and external to one or more of the arms 16 of the cradle 12.

In some embodiments, a second end 32 of the adaptor 14 comprises an electronics interface 34 and a mounting device 36. In these embodiments, the second end 32 is an electro-mechanical coupling device that is configured to couple to a corresponding coupling location in a passenger seat 50.

In some embodiments, the passenger seat 50 coupling location is also an electro-mechanical coupling location, by including both an electronics port 38 (configured to couple to the electronics interface 34) and a receptacle 42 (configured to couple to the mounting device 36). In other embodiments, the passenger seat 50 coupling location may be a mechanical coupling location, by including the receptacle 42, but not the electronics port 38. In these embodiments, the coupling between the PED coupling assembly 10 and the passenger seat 50 is mechanical, with the electronics interface 34 remaining uncoupled.

In other embodiments, the second end 32 of the adaptor 14 is a mechanical coupling device, by including the mounting device 36, but not the electronics interface 34. Such a design may provide a lower cost alternative for the PED coupling assembly 10, where there is no need for an electronics connection to the passenger seat 50. In these embodiments, the passenger may utilize a standard power connection between the PED 20 and a power receptacle in the passenger seat 50 or the PED 20 may be mechanically mounted to the passenger seat 50 without any electronics or power connection of any sort.

In some embodiments, as described above, the passenger seat 50 coupling location is an electro-mechanical coupling location, by including both the electronics port 38 and a receptacle 42. In the embodiments where the second end 32 does not include the electronics interface 34, the coupling between the PED coupling assembly 10 and the passenger seat 50 is mechanical, with the electronics port 38 remaining uncoupled.

In yet other embodiments, as described above, the passenger seat 50 coupling location may only include the receptacle 42. In these embodiments, the coupling between the PED coupling assembly 10 and the passenger seat 50 is mechanical, as neither the electronics interface 34 nor the electronics port 38 are present in these embodiments.

In the various embodiments described above, the electronics interface 34 includes a standardized interface that is configured to couple to the standardized electronics port 38. The electronics port 38 may electronically coupled to the OBE or IFE systems or may be electronically coupled to the passenger vehicle's power system. In these embodiments, the electronics port 38 is coupled to the appropriate system via a cable 40. The mounting device 36 of the adaptor 14 is configured to releasably and mechanically couple to the receptacle 42. The coupling design between the mounting device 36 and receptacle 42 may include but is not limited to snap-fit, twist-lock, pressure fit, or other similar releasable coupling mechanisms.

Figure 2:
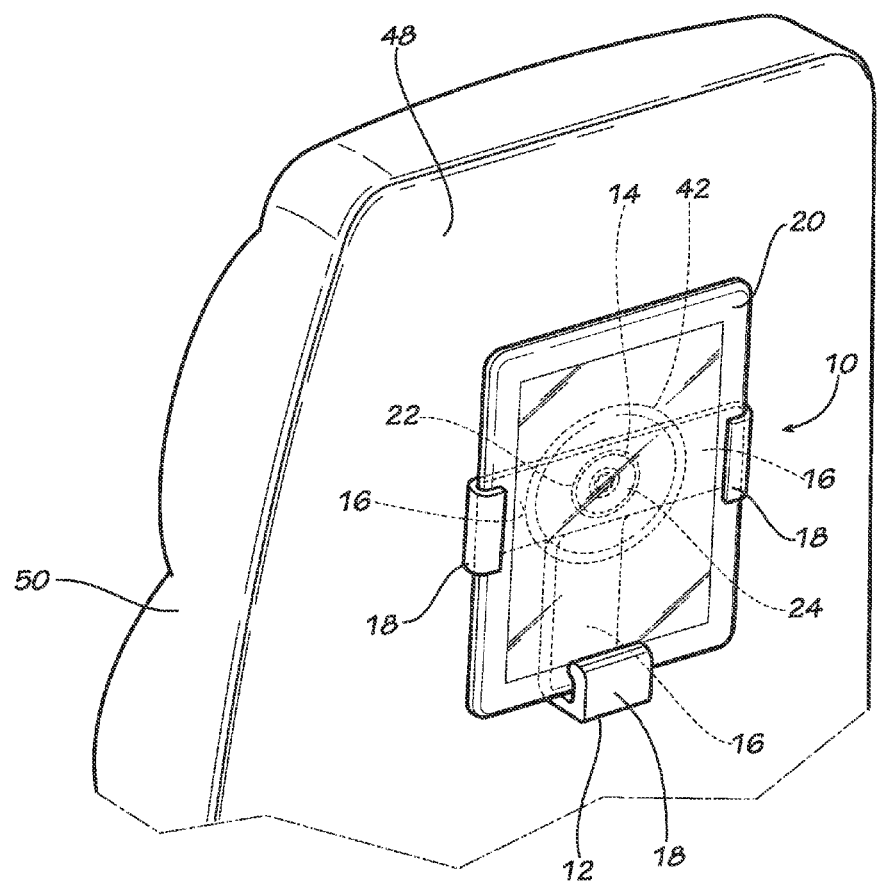
FIG. 2 is a perspective view of the cradle of FIG. 1 in use with a portable electronics device mounted in a portrait orientation to a passenger seat back.
Figure 3:
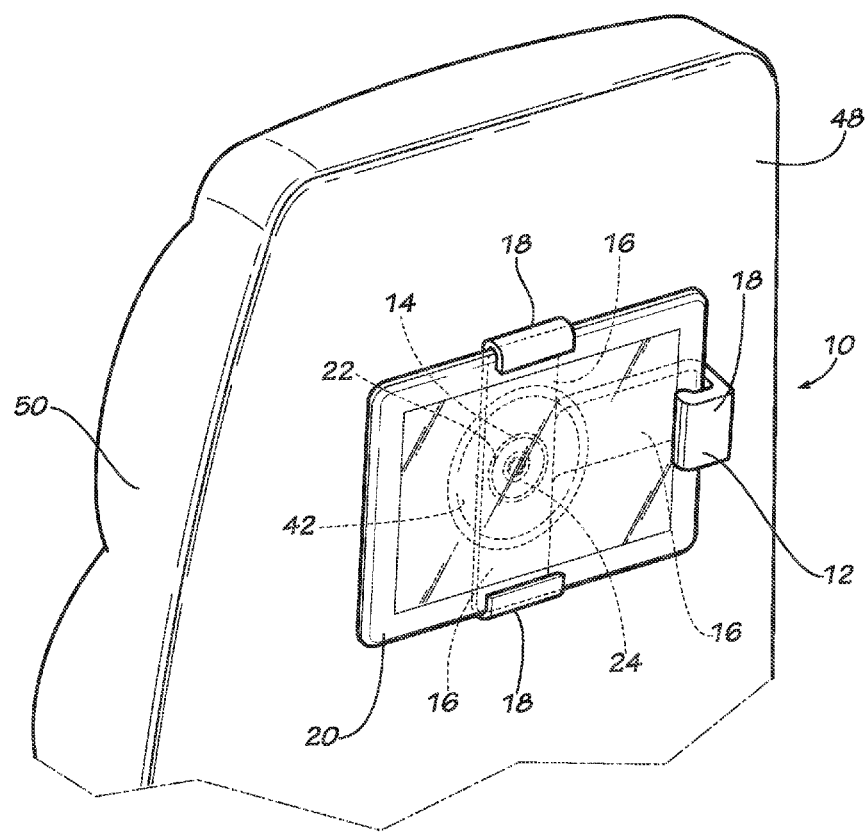
FIG. 3 is a perspective view of the cradle of FIG. 1 in use with a portable electronics device mounted in a landscape orientation to a passenger seat back.

In some embodiments, the PED coupling assembly 10 is configured to be rotationally mounted to the receptacle 42 so that the orientation of the PED 20 may be adjusted depending on the particular design of the PED 20. For example, as shown in FIG. 2, PED 20 is positioned in a portrait orientation relative to a passenger seat back 48. In contrast, in FIG. 3, PED 20 is positioned in a landscape orientation relative to the passenger seat back 48. One of ordinary skill in the relevant art will understand that these are but two examples of a range of suitable positions for the PED coupling assembly 10.

To accomplish the desired rotational coupling between the PED coupling assembly 10 and the receptacle 42, the adaptor 14 may be rotationally coupled to the cradle 12 so that the cradle 12 may be rotated about the adaptor 14. In this embodiment, the mounting device 36 is fixedly coupled to the receptacle 42 so that the rotation occurs in the coupling between the adaptor 14 and the cradle 12.

Alternatively, the mounting device 36 of the adaptor 14 may be rotationally coupled to the receptacle 42 so that the PED coupling assembly 10 may be rotated about the receptacle 42. In this embodiment, the electronics port 38 may also, but not necessarily, be rotationally coupled to the receptacle 42 so that the coupled electronics port 38 and the electronics interface 34 may rotate together relative to the receptacle 42. In this embodiment, the cradle 12 is fixedly coupled to the adaptor 14 so that the rotation occurs in the coupling between the mounting device 36 and the receptacle 42.

In yet other embodiments, it may be desirable to have the PED coupling assembly 10 fixedly mounted to the receptacle 42 so that the PED coupling assembly 10 does not rotate when coupled to the receptacle 42.

Figure 5:
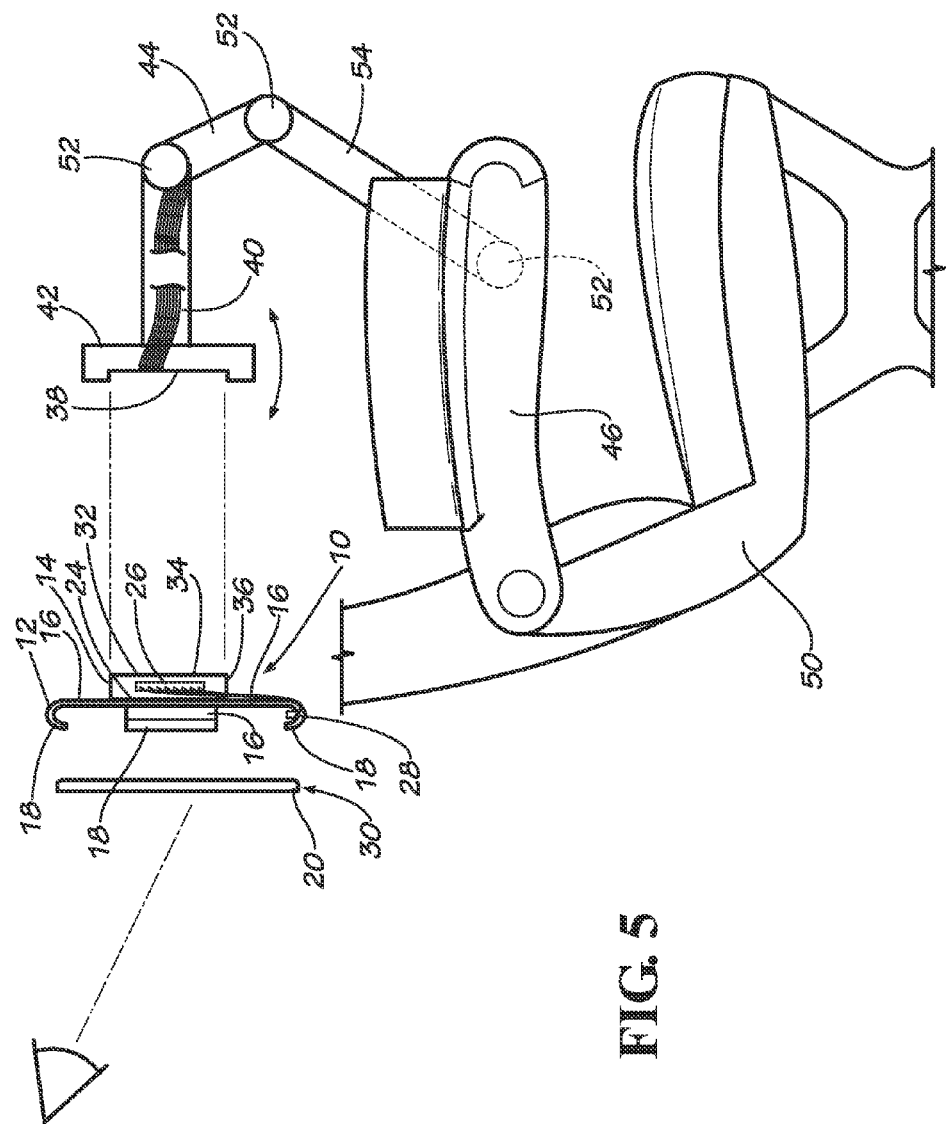
FIG. 5 is a partially exploded perspective view of the cradle of FIG. 1 in use with a portable electronics device mounted to a passenger seat arm via one embodiment of a deployment arm.
Figure 6:
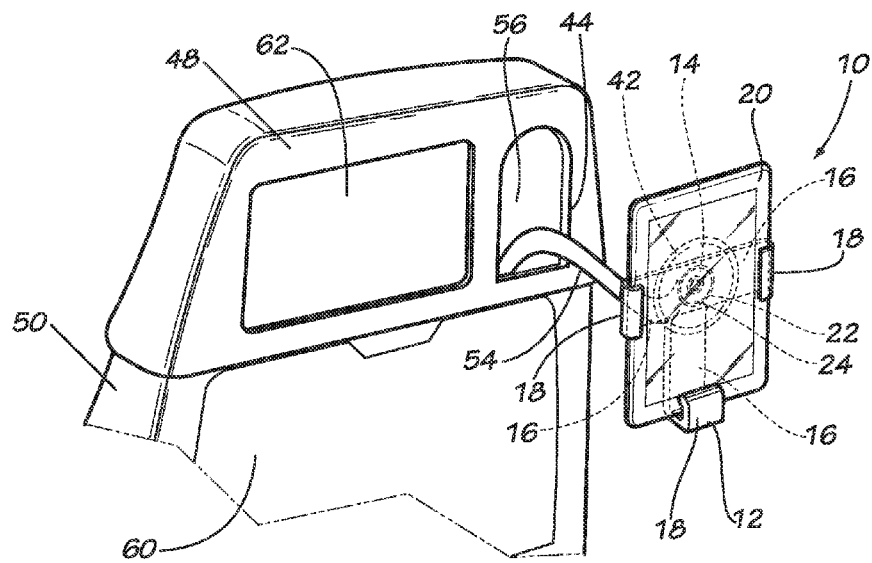
FIG. 6 is a perspective view of the cradle of FIG. 1 in use with a portable electronics device mounted to a passenger seat back via an alternative embodiment of a deployment arm.
Figure 7:
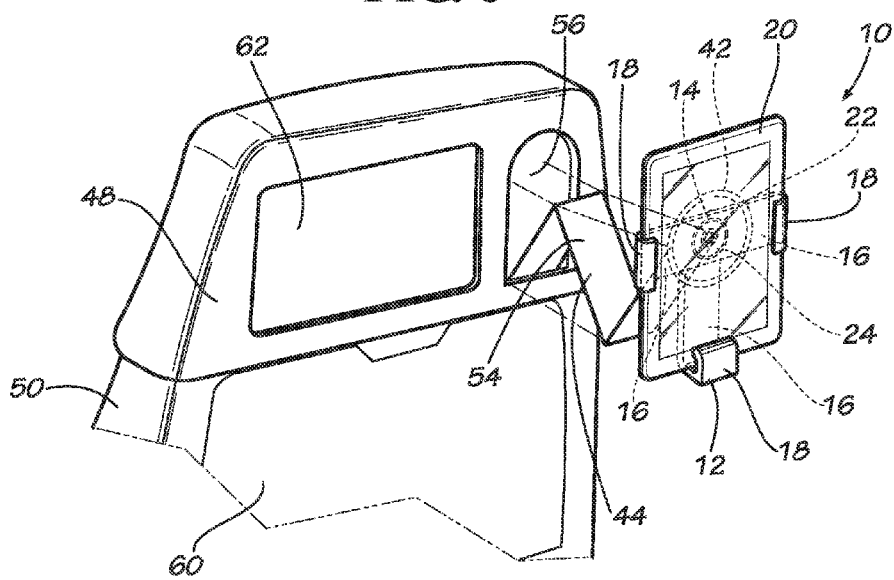
FIG. 7 is a perspective view of the cradle of FIG. 1 in use with a portable electronics device mounted to a passenger seat back via another alternative embodiment of a deployment arm.
Figure 8:
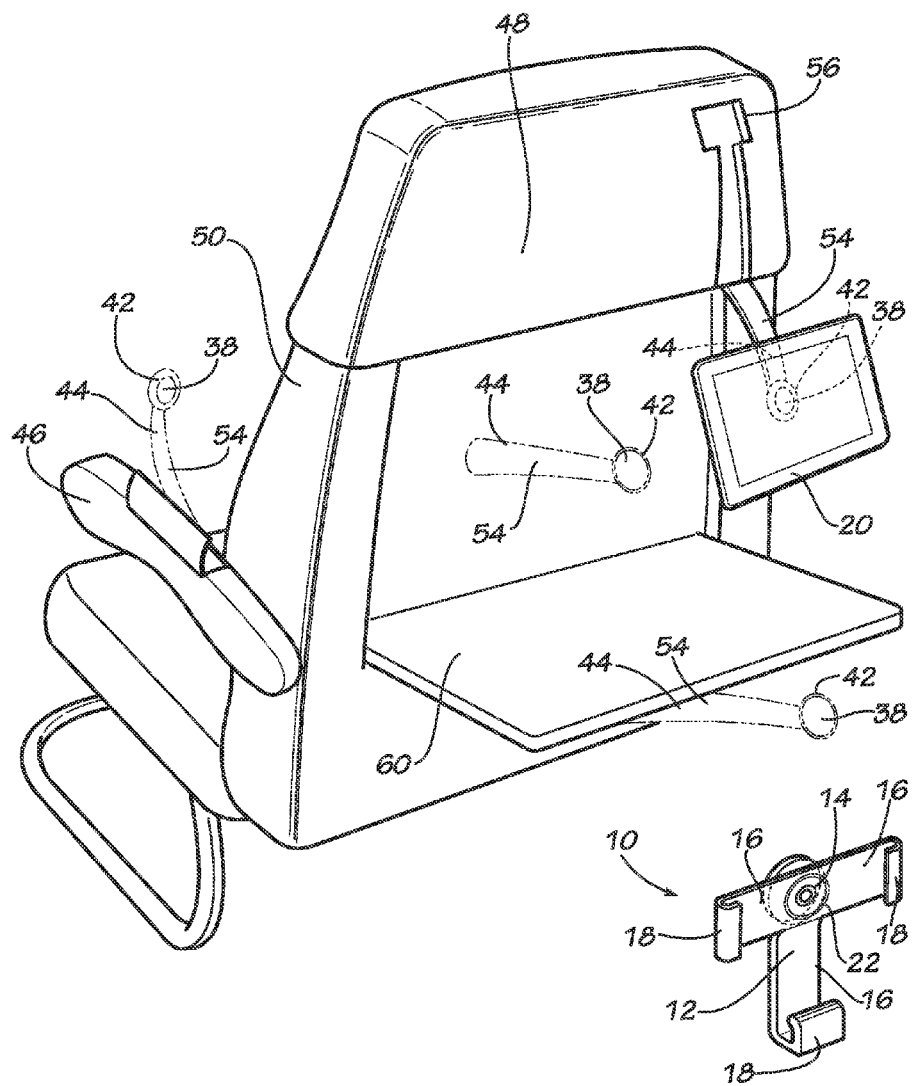
FIG. 8 is a perspective view of the cradle of FIG. 1 in use with a portable electronics device with multiple mounting locations to a passenger seat via another alternative embodiment of a deployment arm.

In some embodiments, the electronics port 38 and the receptacle 42 are mounted to a deployment arm 44. In various embodiments, the deployment arm 44 may be mounted to a passenger seat arm 46 (as shown in FIGS. 5 and 8), a passenger seat back 48 (as shown in FIGS. 6-8), a tray table 60 (as shown in FIG. 8), an edge of the passenger seat back 48 (as shown in FIG. 8), underneath the passenger seat 50, a pivot block, a spreader, or other suitable stowage location. In these embodiments, the deployment arm 44 is formed of materials that allow the deployment arm 44 to adjust to various deployment positions, while providing stability and support for the PED 20. Examples of suitable materials include but are not limited to plastics, aluminum, stainless steel, other metallic materials, composite materials, or other suitable materials. In these embodiments, the cable 40 may be embedded within the deployment arm 44 or may be positioned adjacent an outer surface 54 of the deployment arm 44.

For example, in the embodiment shown in FIG. 5, the deployment arm 44 includes pivot locations 52, which allow the deployment arm 44 to unfold from within the passenger seat arm 46 into a variety of deployed positions to provide flexible positioning and support for the PED 20. In the embodiment shown in FIG. 6, the deployment arm 44 is a bendable device that allows the deployment arm 44 to be pulled from within the passenger seat back 48 into a variety of deployed positions to provide flexible positioning and support for the PED 20. In the embodiment shown in FIG. 7, the deployment arm 44 includes a foldable design, where the deployment arm 44 unfolds and expands to provide support for the PED 20.

In the embodiment shown in FIG. 8, the deployment arm 44 may be pivotally coupled to a variety of locations, such as the passenger seat back 48 or an edge of the tray table 60. In both of these locations, the deployment arm 44 is generally concealed when the tray table 60 is stowed. The deployment arm 44 may also be pivotally coupled to the passenger seat arm 46 or an edge of the passenger seat back 48. In each of these embodiments, the deployment arm 44 may include a curved shape that provides resistance and support for the PED 20 when the deployment arm 44 is rotated into a deployed position.

In the embodiments where the deployment arm 44 is stowed within the passenger seat back 48, such as the embodiments shown in FIGS. 6-8, the passenger seat back 48 may include an opening 56. The opening 56 is configured to allow the deployment arm 44 to retract into a stowed position when the electronics port 38 is not in use. The opening 56 may optionally include a cover (not shown) that prevents damage to the electronics port 38 when not in use.

Figure 4:
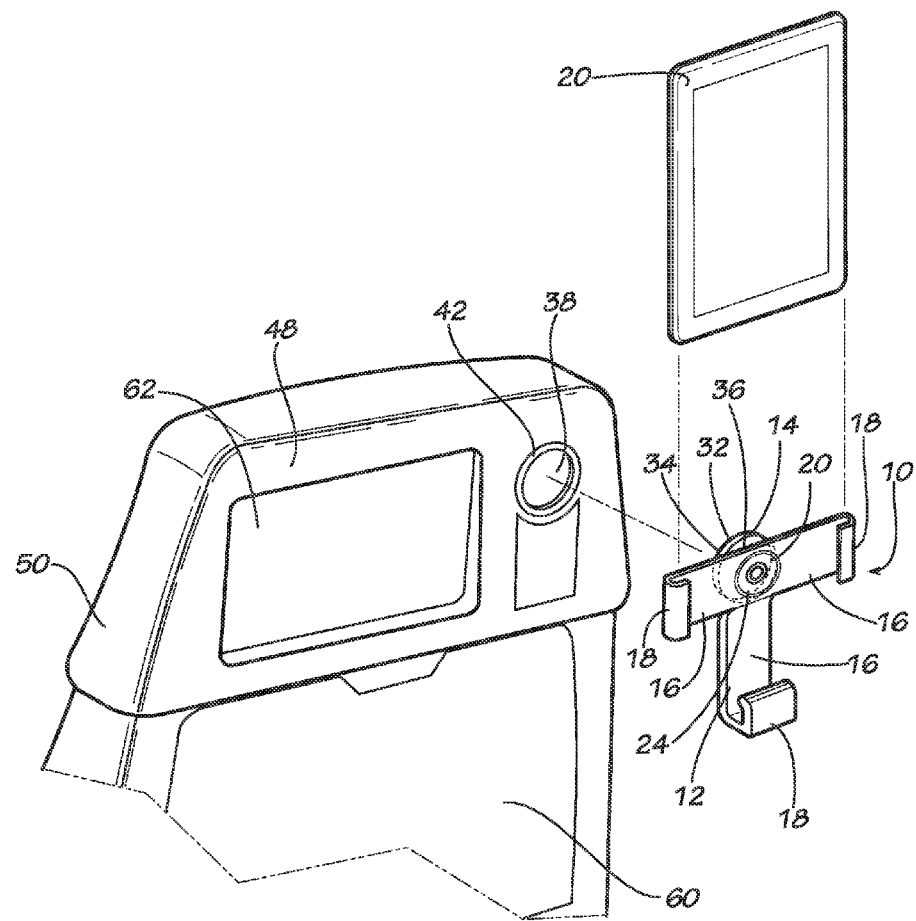
FIG. 4 is an exploded perspective view of the cradle of FIG. 1 in use with a portable electronics device mounted to a passenger seat back.
Figure 9:
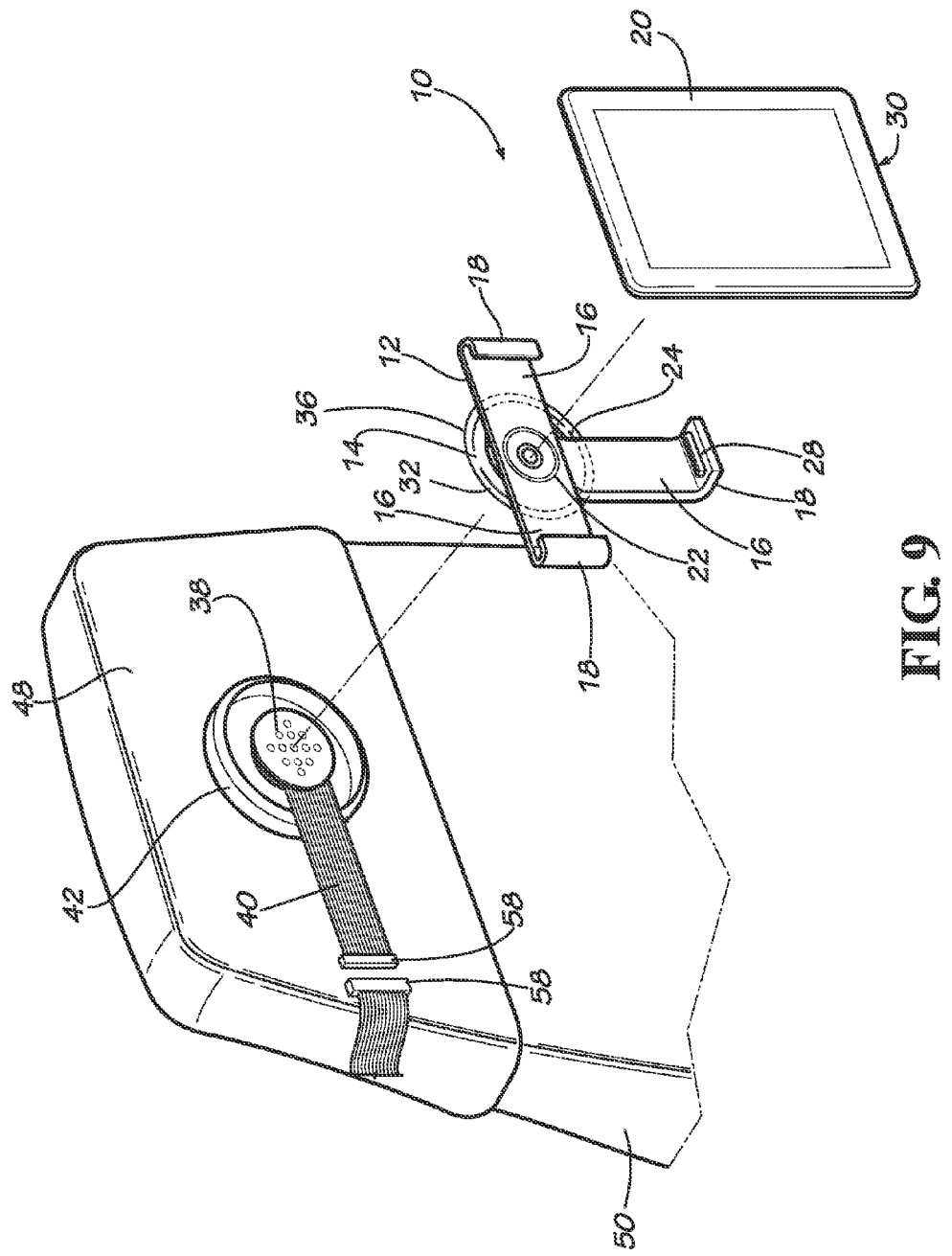
FIG. 9 is an exploded perspective view of the cradle of FIG. 1 in use with a portable electronics device mounted to a passenger seat back.

In the embodiments shown in FIGS. 4 and 9, the electronics port 38 is mounted directly to the passenger seat back 48. In these embodiments, the cable 40 is configured to extend from the electronics port 38 directly to the electronics system. The cable 40 may include a coupling location 58, as shown in FIG. 9, which allows the electronics port 38 to be easily interchanged without the need to rewire a new electronics port 38 into the electronics system.

When a passenger is ready to connect the PED 20 to the electronics system and/or to mount the PED 20 for hands-free viewing, the passenger mechanically couples the cradle 12 to the PED 20. The PED interface 26 is then electronically coupled to the PED 20. In some embodiments, the connector 28 may be inserted into the receptacle 30 on the PED 20.

Once the PED 20 has been mechanically coupled to the cradle 12 and electronically coupled to the PED interface 26, the electronics interface 34 is electronically coupled to the electronics port 38, and the mounting device 36 is mechanically coupled to the receptacle 42. In some embodiments, the passenger may remove the cover (not shown) from the opening 56 to access the electronics port 38. In other embodiments, the passenger may need to deploy the deployment arm 44 from its stowed position to access the electronics port 38.

The standardized design of the electronics port 38 allows for a single standardized output from the electronics system, which simplifies the design and installation of the system, including but not limited to OBE or IFE systems, power systems, or other suitable systems. The use of the electronics interface 34 and the PED interface 26 provides a standardized coupling to the electronics port 38 on one end with a customized coupling to a variety of types of PEDs 20 on the other end. This capability allows the electronics system to accommodate a variety of styles and upgrades to the PEDs 20 without the need for constant upgrades and/or changes to the system. For example, a passenger may purchase a PED coupling assembly 10 specific for his or her PED 20, which includes a completely customized PED interface 26 and a customized shape and size for the cradle 12. Each PED coupling assembly 10 also includes the standardized electronics interface 34, which allows the PED 20 to be coupled to the electronics system.

Such customized PED coupling assemblies 10 may be purchased prior to boarding the aircraft, in airport kiosks, or other types of stores. The PED coupling assemblies 10 may be sold as part of an accessory pack for the particular PED 20. One of ordinary skill in the relevant art will understand that such devices may be marketed and sold to passengers through a variety of venues prior to or during flight, as airlines may also choose to provide customized PED coupling assemblies 10 for passengers' use. For example, airlines may choose to purchase commercially available PEDs to provide or rent to passengers for use in conjunction with the OBE or IFE systems, power systems, or other suitable systems, where the passengers may either use the PEDs in conjunction with those components or in lieu thereof for additional entertainment options.

In these embodiments, the passenger may use the PEDs 20 with the electronics system in conjunction with a pre-existing video display 62, as shown in FIGS. 4, 6, and 7. In other embodiments, the PEDs 20 may be used in place of the video display 62, as shown in FIGS. 2-3 and 8-9. In yet other embodiments, the PED 20 may be connected to the electronics system for purposes of supplying power to the PED 20, but is not otherwise electronically coupled to any other system, including but not limited to OBE or IFE systems, power systems, or other suitable systems.

In still yet other embodiments, the deployment arms 44 described herein may be used to mount the PEDs 20 for hands-free viewing without the use of any coupling to any type of electronics system. In these embodiments, the PEDs 20 may optionally be wirelessly connected to a wireless router.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A portable electronics device coupling assembly for use by a user to releasably couple a portable electronics device to a passenger seat, the passenger seat having a port coupled with an on-board entertainment system, the on-board entertainment system comprising internet access, the portable electronics device coupling assembly comprising:
   (a) a cradle configured to receive and secure the portable electronics device within the cradle, the cradle further including a portable electronics device interface with a connector configured to electronically couple and releasably engage the received portable electronics device, the cradle releasably engaging with the portable electronics device during normal user operation; and
   (b) an adaptor coupled with the portable electronics device interface of the cradle, the adaptor configured to be insertable within the port of the passenger seat to electronically couple and releasably engage the portable electronics device interface of the cradle with the passenger seat, the adaptor releasably engaging the portable electronics device interface of the cradle with the passenger seat during normal user operation; and
   wherein the portable electronics device interface is configured to provide bidirectional transmission of data between the received portable electronics device and the on-board entertainment system through the electrical coupling of the adaptor to the passenger seat such that the portable electronics device may access the internet through the on-board entertainment system;
   wherein the adaptor is configured to be inserted within the port of the passenger seat along an insertion axis, wherein the cradle includes an aperture positioned about the insertion axis of the adaptor, wherein the adaptor couples with the cradle at the aperture, and wherein the cradle is rotatably coupled to the adaptor such that the user may rotate the cradle relative to the adaptor about the insertion axis of the adaptor so as to rotate a coupled portable electronics device about the insertion axis of the adaptor between portrait and landscape orientations.

2. The portable electronics device coupling assembly of claim 1, wherein the cradle comprises at least one arm and wherein the connector of the portable electronics device interface is mounted on the at least one arm and configured to electronically engage a receptacle on the portable electronics device.

3. The portable electronics device coupling assembly of claim 1, wherein the portable electronics device is a tablet computer, a cell phone, a smart phone, a handheld video game system, a personal digital assistant, a palmtop computer, a portable DVD player, or a portable data or audio-video media, or a multi-media enabled device.

4. The portable device coupling assembly of claim 1, wherein the aperture is positioned on the cradle so that the aperture is centered relative to the received portable electronics device.

5. The portable device coupling assembly of claim 1, wherein the portable electronics device interface is configured to provide bidirectional transmission of data between the received portable electronics device and the on-board entertainment system such that the portable electronics device may receive data from the on-board entertainment system for display to a portable electronics device display.

6. A portable electronics device coupling assembly for use by a user to releasably couple a portable electronics device to a passenger seat, the passenger seat having a port coupled with an on-board entertainment system, the on-board entertainment system comprising internet access, the portable electronics device coupling assembly comprising:
   (a) a cradle configured to receive and secure a portable electronics device within the cradle, the cradle further including a portable electronics device interface with a connector configured to electronically couple and releasably engage the received portable electronics device, the cradle releasable engaging with the portable electronics device during normal user operation; and
   (b) an adaptor coupled with the portable electronics device interface of the cradle, the adaptor configured to be insertable within the port of the passenger seat to electronically couple and releasably engage the portable electronics device interface of the cradle with the passenger seat, the adaptor releasably engaging the portable electronics device interface of the cradle with the passenger seat during normal user operation; and
   wherein the portable electronics device interface is configured to provide bidirectional transmission of data between the received portable electronics device and the on-board entertainment system through the electrical coupling of the adaptor to the passenger seat such that the portable electronics device may access the internet through the on-board entertainment system;
   wherein the adaptor of the portable electronics device coupling assembly is configured to be inserted into the port of the passenger seat along an insertion axis, and wherein the adaptor rotatably couples to the port of the passenger seat such that the user may rotate the adaptor relative to the port so as to rotate a coupled portable electronics device about the insertion axis of the adaptor to rotate the coupled portable electronics device between portrait and landscape orientations.

7. A portable electronics device coupling assembly for use by a user to releasably couple a portable electronics device to a passenger seat, the passenger seat having a port coupled with an on-board entertainment system, the portable electronics device coupling assembly comprising:
   (a) a cradle configured to receive and secure the portable electronics device within the cradle, the cradle further including a portable electronics device interface with a connector configured to electronically couple and releasably engage the received portable electronics device, the cradle releasably engaging with the portable electronics device during normal user operation; and
   (b) an adaptor coupled with the portable electronics device interface of the cradle, the adaptor configured to be insertable within the port of the passenger seat to electronically couple and releasably engage the portable electronics device interface of the cradle with the passenger seat, the adaptor releasably engaging the portable electronics device interface of the cradle with the passenger seat during normal user operation; and
   wherein the portable electronics device interface is configured to provide bidirectional transmission of data between the received portable electronics device and the on-board entertainment system through the electrical coupling of the adaptor to the passenger seat such that the portable electronics device may receive content from the on-board entertainment system for display to a portable electronics device display;

wherein the adaptor is configured to be inserted within the port of the passenger seat along an insertion axis, wherein the cradle includes an aperture positioned about the insertion axis of the adaptor, wherein the adaptor couples with the cradle at the aperture, and wherein the cradle is rotatably coupled to the adaptor such that the user may rotate the cradle relative to the adaptor about the insertion axis of the adaptor so as to rotate a coupled portable electronics device about the insertion axis of the adaptor between portrait and landscape orientations.

8. A portable electronics device coupling assembly for use by a user to releasably couple a portable electronics device to a passenger seat, the passenger seat having a port coupled with an on-board entertainment system, the portable electronics device coupling assembly comprising:

(a) a cradle configured to receive and secure the portable electronics device within the cradle, the cradle further including a portable electronics device interface with a connector configured to electronically couple and releasably engage the received portable electronics device, the cradle releasably engaging with the portable electronics device during normal user operation; and (b) an adaptor coupled with the portable electronics device interface of the cradle, the adaptor configured to be insertable within the port of the passenger seat to electronically couple and releasably engage the portable electronics device interface of the cradle with the passenger seat, the adaptor releasably engaging the portable electronics device interface of the cradle with the passenger seat during normal user operation; and wherein the portable electronics device interface is configured to provide bidirectional transmission of data between the received portable electronics device and the on-board entertainment system through the electrical coupling of the adaptor to the passenger seat such that the portable electronics device may receive content from the on-board entertainment system for display to a portable electronics device display;

wherein the adaptor of the portable electronics device coupling assembly is configured to be inserted into the port of the passenger seat along an insertion axis, and wherein the adaptor rotatably couples to the port of the passenger seat such that the user may rotate the adaptor relative to the port so as to rotate a coupled portable electronics device about the insertion axis of the adaptor to rotate the coupled portable electronics device between portrait and landscape orientations.

* * * * *